Figure 1:
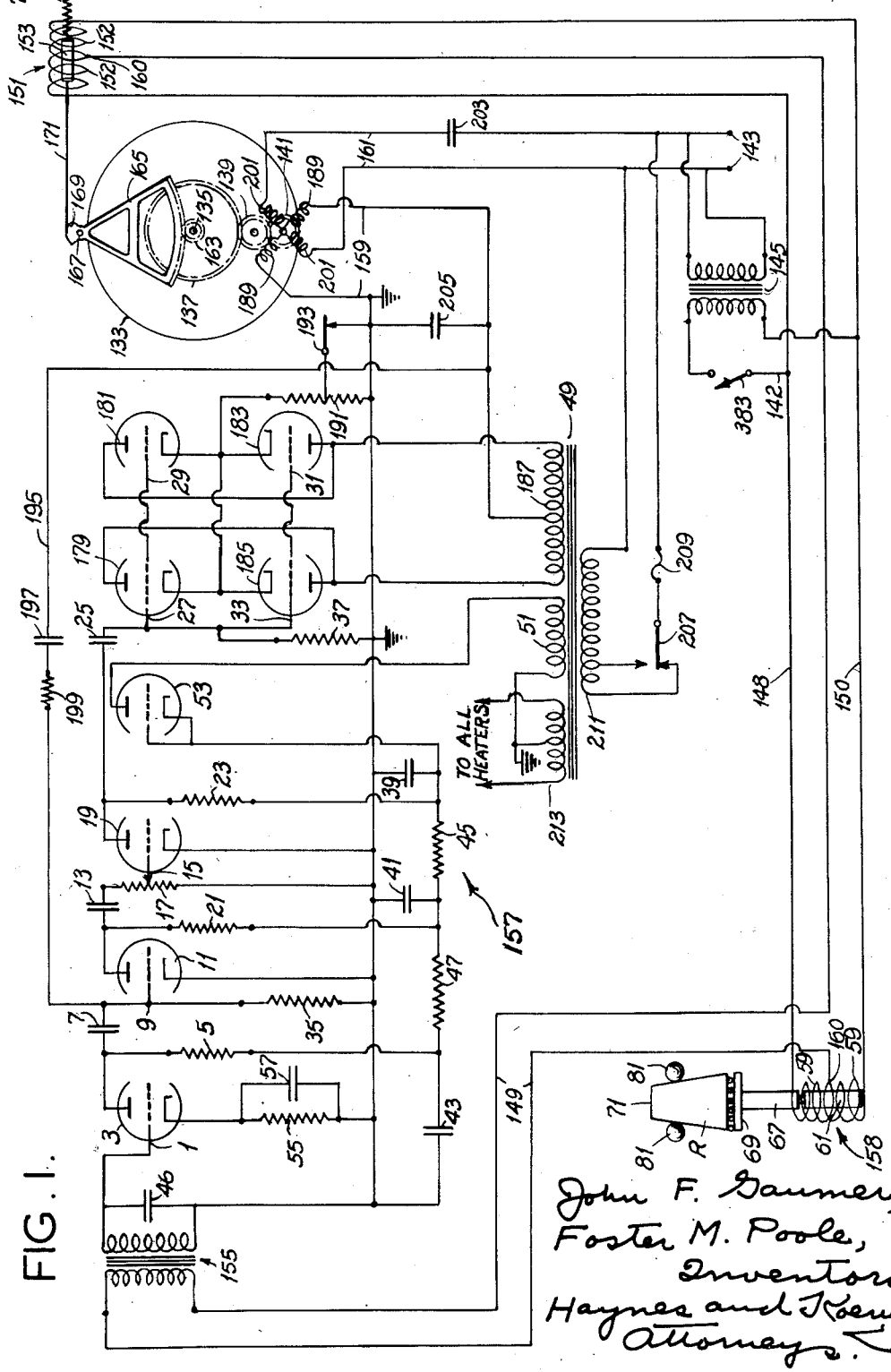

April 11, 1950  J. F. GAUMER ET AL  2,503,868
IMPEDANCE BRIDGE, REBALANCING, TELEMETRIC SYSTEM
Filed July 18, 1946  2 Sheets-Sheet 1

John F. Gaumer,
Foster M. Poole,
Inventors.
Haynes and Koenig
Attorneys.

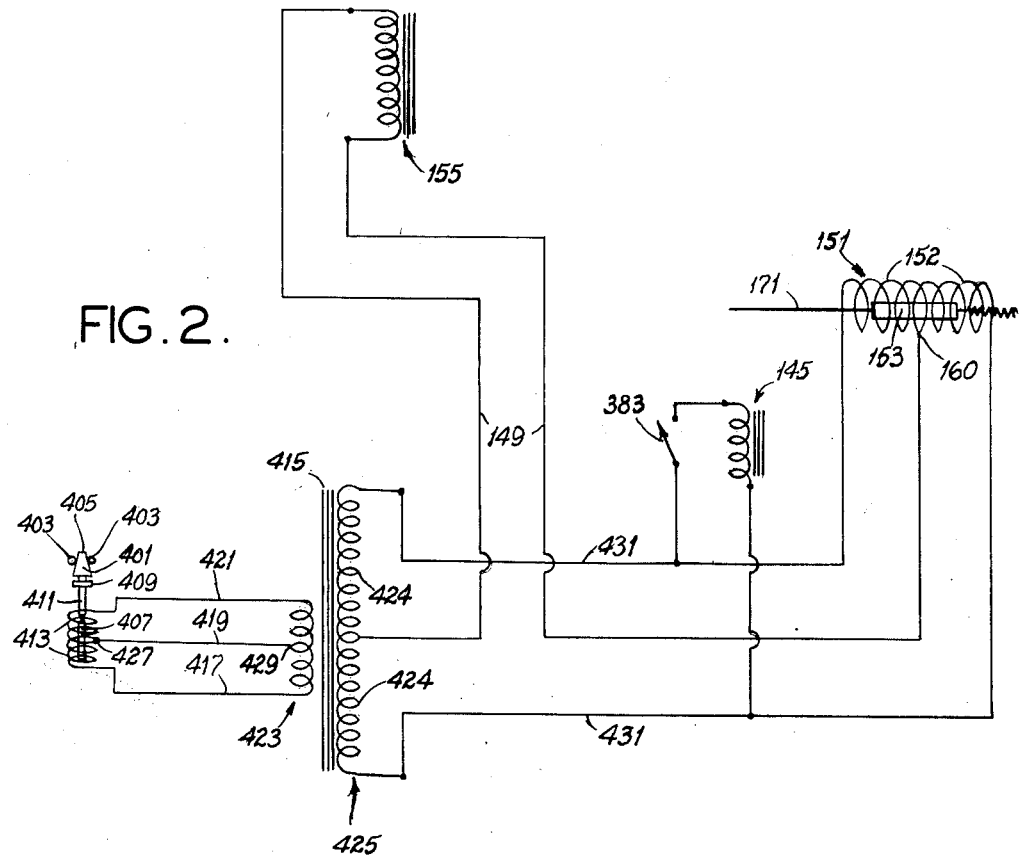

Patented Apr. 11, 1950

2,503,868

UNITED STATES PATENT OFFICE 2,503,868

IMPEDANCE BRIDGE, REBALANCING, TELEMETRIC SYSTEM

John F. Gaumer and Foster M. Poole, Dallas, Tex.; said Gaumer assignor to said Poole Application July 18, 1946, Serial No. 684,609

1 Claim. (Cl. 177—351)

This invention relates to control circuits, and with regard to certain more specific features, to a control circuit for telemetric systems utilizing a rebalancing impedance bridge.

This invention is an improvement upon the circuit shown in Fig. 21 of a copending United States patent application of Foster M. Poole (one of the inventors herein), Serial No. 649,650, dated February 23, 1946.

Among the several objects of the invention may be noted the provision of an improved bridge amplifier circuit for controlling the rotation of a two-phase, reversible control motor; the provision of means of the class described for reducing hunting of said motor; the provision of a circuit of the class described which will permit the use of substantial differences in transmitter and receiver coil sizes in the bridge circuit; and the provision of anti-hunting apparatus of the class described which is substantially instantaneously operable and which is simple in form. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claim.

In the accompanying drawings, in which several of various possible embodiments of the invention are illustrated, Fig. 1 is a wiring diagram of one form of the invention; and, Fig. 2 is a wiring diagram, corresponding to a part of Fig. 1 but showing a modification.

Similar reference characters indicate corresponding parts throughout the several views of the drawings.

Where feasible in the drawings, reference characters have been used which correspond to those used in said Fig. 21 of said patent application.

In said patent application are shown certain dial drums or indicators 133 which are rotary with shaft 135 for the purpose of giving certain indications of measurements in response to the actions of exploring transmitters R (see said Fig. 21 in said application).

Each dial (also illustrated herein) is driven by a gear 137 attached to a shaft 135. Gear 137 is driven through a gear train 139 leading from a two-phase balancing motor 141. The motor 141 is reversible and is connected into a circuit which is developed herein. Numeral 143 indicates an A. C. supply line. This supply line 143 supplies an impedance bridge circuit through an isolating transformer 145 and leads 147. The isolating transformer may be omitted in some designs. The circuit consists of a coil 158 made up of a pair of coil sections 59 and a coil 151 composed of coil sections 152, all of which are interconnected through leads 148 and 150, and two armatures 61 and 153. The armature 61 is activated by a measurement transmitter R. Armature 153 is activated by a flexible band or linkage 171, which is biased by spring 70 and is connected mechanically to the indicating dial drum 133. A switch 383 is used to deenergize the impedance bridge when desired.

The transmitter or detector R consists, among other elements, of feeler or detector balls 81 which, in being driven through a cylinder to be measured, move radially and transmit axial movement to a cone 71. This axial movement is transmitted from the cone 71 to armature 61 through a thrust bearing 69 and stem 67. This movement of armature 61 through coil sections 59 will vary the electrical characteristics of the impedance bridge circuit, thus translating mechanical movement into electrical variations. Further details can be obtained by reference to my United States Patent 2,348,643.

The center tap 160 of each pair of coil sections 59 and 152 supplies an input transformer 155 via lines 149. This input transformer 155 feeds an amplifier network or circuit, indicated generally at 157, which through leads 159 feeds a control phase of the two phase reversible motor 141. The other and fixed phase of the motor is fed via leads 161 from the A. C. line 143.

Connected with the gear 137 on the shaft 135 is a pinion 163 which is meshed with a sector gear 165 swinging on a pivot 167. This sector gear 165 carries an arcuate shoe 169 over which is wrapped and connected the flexible band 171 such as a flexible steel ribbon. This ribbon is connected with the armature 153.

As described in said application, the motor 141 controls the position of its associated dial drum 133. When the feeler balls 81 are held in a predetermined position for proper diameter, the armature 153 may be considered to be in a position to hold its respective dial drum 133 at zero reference position for nominal diameter. For any deviations from a nominal diameter, the feeler balls 81 will change their radial positions, thus affecting movement of the cone 71 so as to reposition the armature 61. This unbalances the impedance bridge circuit so as to energize the input side of the transformer 155. Any small unbalance is amplified in the amplifier 157 and applied by leads 159 to one phase of the motor 141, the other phase of the motor being energized over connections 161. Thus the motor 141 is caused to reposition the armature 153 to re-establish a new balance of the impedance bridge circuit. A low A. C. voltage arising from any minute unbalancing of the bridge is amplified sufficiently to energize the balancing motor 141. The phase of this A. C. voltage is dependent upon the direction of the movement of the armature 61.

The balancing motor 141 is of the reversible variable-speed induction type, one winding of which is continuously energized by line voltage, the other energized by the amplified alternating voltage the phase of which, with respect to the line voltage, determines the direction of rotation of the motor. Thus the phase is in effect recognized by the balancing motor 141, hence determining its direction of rotation. As is known, any two-phase motor remains stationary when one of its phases is deenergized. Therefore, whenever there is no energization of the connection 159, the motor 141 will be stationary. The result is that the motor action follows the measuring action of the balls 81, in one direction for plus deviation from a nominal diameter and in the reverse direction for minus deviation from said nominal diameter. After each following action and balancing of the impedance bridge circuit the dial drum 133 takes up a new position proportionately following the deviations from nominal diameter.

The above has been described in said application. The present invention has as its point of departure the provision of means for minimizing the hunting characteristics of such a motor as 141 in making its adjustments.

Referring now more particularly to Fig. 1, any movement of armature 61, as previously described, will cause a current to flow through the primary of transformer 155. The amount of this current flow will depend on the distance armature 61 moves. The voltage developed across the primary of transformer 155 is therefore variable in amplitude and is also variable in phase, leading or lagging the line voltage, depending upon the direction of movement of the armature 61.

A voltage is induced in the secondary of transformer 155 and is proportionate to the primary voltage described above. This secondary voltage is impressed on a grid 1 of a vacuum tube 3. The amplifier reproduction of this grid voltage is developed across a plate load resistor 5, coupled through a condenser 7 to a grid 9 of a vacuum tube 11. Vacuum tube 11 amplifies the signals impressed upon grid 9 and this amplified signal developed across a load resistor 21, is coupled through condenser 13 to a grid 15 of a vacuum tube 19, the input signal to grid 15 being variable in amplitude by means of a potentiometer 17. The output signal of tube 19 is developed across a load resistor 23 and coupled to grids 27, 29, 31 and 33 of vacuum tubes 179, 181, 183 and 185, respectively, through condenser 25.

Resistors 35, 37 are grid resistors, and condensers 37, 41 and 43 are used for both filtering and decoupling. Resistors 45 and 47 are used as decoupling resistors, and condenser 46 serves to by-pass unwanted spurious frequencies and harmonics. The power source for the described amplifier stages is the rectified output of a secondary winding 51 of a transformer 49, as rectified by a vacuum tube 53. Condenser 57 and resistor 55 are conventionally connected to provide cathode bias for tube 3.

Tubes 179, 181, 183 and 185 are connected in a push-push phase detecting circuit that also provides power amplification of the input signal impressed on grids 27, 29, 31 and 33. The anodes of tubes 179 and 185 are commonly connected to one end of a secondary winding 187, and the anodes of tubes 181 and 183 are commonly connected to the other end of secondary winding 187 of transformer 49, this transformer through two wires 159 supplying the power to the control phase 189 of the two-phase motor 141.

The output of alternating current to the control phase 189 of motor 141 will be controlled as to phase and amplitude by the signal impressed on grids 27, 29, 31 and 33. The bias for the power amplifier tubes 179, 181, 183 and 185 is supplied from a tapped cathode bias resistor 191, the lower section of which is normally shunted except when a limit switch 193 is opened.

It can be seen that any out-of-phase signal transmitted to the controlled phase 189 will cause the motor 141 to rotate, moving in turn armature 153 toward a position that will balance the impedance bridge, and it can also be seen that there is some tendency for armature 153 to be moved past a position necessary to balance the bridge. This overshooting of the balance point will cause a signal to be impressed on controlled phase 189 that will be 180° out of phase with the original signal on controlled phase 189 and will therefore cause motor 141 and armature 153 to move in the reverse direction. This action, or hunting, can be greatly decreased, by the addition of a feed-back circuit connected from the ungrounded end of controlled phase 189 through a wire 195, a condenser 197 and a resistor 199 to grid 9 of tube 11. The signal sent through wire 195, condenser 197 and resistor 199 will be in phase and proportional to the signal impressed on the controlled phase 189, but this signal will be 180° out of phase with the instantaneous signal impressed on grid 9 of tube 11 and will thereby tend to cancel it. The activating signal for controlled phase 189 will therefore be partially cancelled while still at a low level of amplification, such as at grid 9, and greatly decrease hunting.

The fixed-phase winding 201 of the two-phase motor is fed through two lines 161 from a conventional alternating current source, the latter also supplying power to the inductance bridge circuit, directly or through a transformer 145. Condensers 203 and 205 are phase shifting condensers of the type normally used with two-phase motors.

The transformer 49 is powered from an alternating current source, protected from overload by fuse 209, and it has a tapped primary 211 controlled by a switch 207, this switch being used in one position for higher than normal line voltages and in the other position for lower than normal line voltages. A secondary 213 of transformer 49 is used to supply power to the filament of the amplifier tube.

Although tubes 1, 11, 19, 53, 179, 181, 185 and 183 are described as separate triode tubes, it is to be understood that duo-triode type tubes may be used. For example, tubes 179 and 181 could be paired in the same glass envelope of a single duo-triode tube and likewise tubes 3 and 11; 19 and 53; 193 and 185.

In a bridge circuit of the type described above, ordinarily the two pairs of coil sections 59 and 152 were of substantially the same size. If, however, the size of the armature 61 and coil sections 59 must be made very small, as would be necessary for the measurement of a very small diameter cylinder, certain difficulties would arise. Temperatures would occur in the small coil sections which would be higher than those in the then relatively larger coil sections 152. This is because the small coil sections would be carrying the same current as the larger coil sections. While balanced conditions could be brought about under different temperature conditions in coil sections 59 and 152, operators would, before measurements could be taken, need to wait until equilibrium temperature of the smaller modified coil sections 59 was reached. This is a disadvantage. Furthermore, the design and construction under unequal temperature conditions would be difficult. A system that will permit the use of a very small transmitting armature 61 without reducing the size of armature 153 and coil sections 152 and without loss of accuracy or unequal temperature rises is shown in Fig. 2.

Referring now to Fig. 2, there is noted a small transmitter or detector 401, consisting among other things of feeler balls 403 which, in being driven through a small cylinder to be measured, move radially and transmit axial movement to a cone 405. This axial movement is transmitted from the cone 405 to movable transmitter armature 407 through a thrust bearing 409 and a stem or linkage 411. The movement of this armature 407 will cause a variation in the current flow in coil sections 413, center-taps 427 and 429, wires 417, 419 and 421, and this current variation in turn will affect the current flow through winding 423 of a transformer 415. This will result in variations in the electrical characteristics of a winding 425 which will cause an unbalance in the impedance bridge circuit including the end sections 424 of winding 425, coil sections 152 of winding 151, wires 431 and 149. This in turn causes a signal to be impressed on transformer 155 through wires 149. The transformer windings 424 are such, in view of the electrical characteristics impressed thereon from winding 423, that their own electrical characteristics match those of sections 152 under balanced conditions of the armatures 407 and 153. At the same time, currents are employed in coil sections 413 which do not appreciably heat them any more than coil sections 152 are heated. It can therefore be seen that a small movement in the armature 407, causing a small current variation in winding 423, will bring about a relatively great movement in balancing armature 153 to balance the electrical variation across winding 425 of transformer 415. This will give greatly increased accuracy of measurement and without undue heating of coils 413.

The use of the term "impedance bridge circuit" is intended to cover such a circuit wherein suitable resistances and capacitances are used with, or in place of the coils 59, 413 and 151.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

Indicating apparatus comprising a detector, an indicator, a two-phase reversible motor connected with said indicator to drive it back and forth, said motor having a fixed phase and a control phase, an impedance bridge circuit adapted to be thrown out of electrical balance by a movable transmitter armature and to be balanced by a movable balancing armature, said circuit including four coil inductances and a transformer, the impedance of a first two of said coil inductances being controlled by said transmitter armature, the impedance of a second two of said coil inductances being controlled by said balancing armature, said second two inductances being physically larger in their coil forms than said first two inductances, the transformer having its primary connected to said first two inductances and its secondary connected to said latter two larger inductances, a first linkage for transmitting movement from said indicator to said balancing armature, a second linkage for transmitting movement from the detector to the transmitter armature, an amplifying network including at least two vacuum tube sections connected in a push-push circuit adapted variably to energize said control phase of the motor in response to an unbalanced condition in said impedance bridge circuit, and a feed-back circuit between the control phase of said motor and said amplifying network, the potential of said circuit being in phase with the potential of the control phase of the motor and approximately 180° out of phase with the potential of said amplifying network at the point of connection thereto, the impedance of said first two inductances being substantially different than the impedance of said second two inductances when said armatures are in a balanced condition.

JOHN F. GAUMER.
FOSTER M. POOLE.

REFERENCES CITED

The following references are of record in the file of this patent:

UNITED STATES PATENTS

| Number | Name | Date |
|---|---|---|
| 1,708,910 | Spencer | Apr. 9, 1929 |
| 2,021,752 | Suits | Nov. 19, 1935 |
| 2,075,083 | Bernarde | Mar. 30, 1937 |
| 2,154,375 | Chambers | Apr. 11, 1939 |
| 2,209,369 | Wills | July 30, 1940 |
| 2,234,349 | Mackay | Mar. 11, 1941 |
| 2,328,320 | Baruch | Aug. 31, 1943 |
| 2,406,221 | Hornfeck | Aug. 20, 1946 |
| 2,414,317 | Middel | Jan. 14, 1947 |

OTHER REFERENCES

Radio Amateur's Handbook, 1941 edition, pages 34–56.

Publication: Telemetering and Totalizing, Borden; Instruments. December 1935, page 328.